Figure 1:
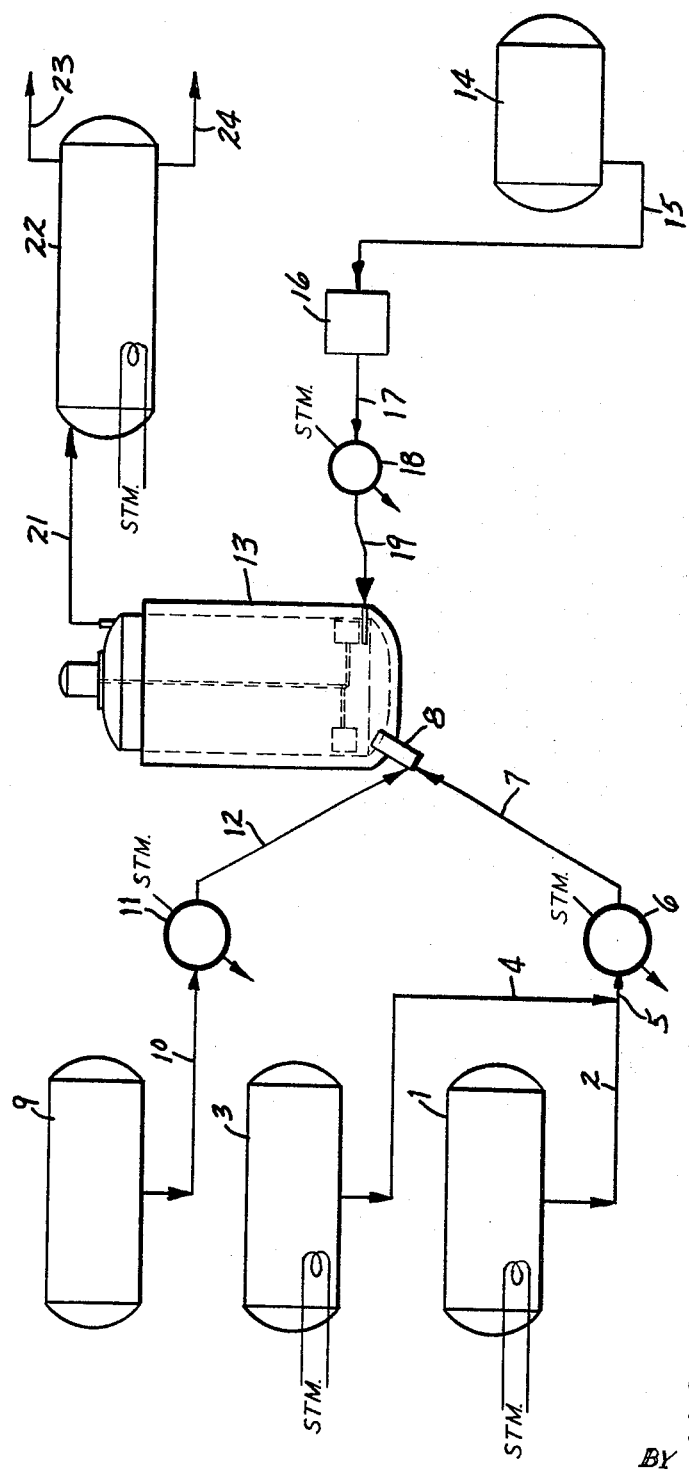

Nov. 22, 1966  W. I. DENTON ETAL  3,287,387
PROCESS FOR THE PRODUCTION OF AROMATIC ISOCYANATES
Filed July 29, 1963  2 Sheets-Sheet 1

FIG. I

INVENTORS
WILLIAM I DENTON
PHILIP D. HAMMOND
JUDSON A. WOOD
BY Walter D. Hunter
AGENT

INVENTORS:
WILLIAM I. DENTON
PHILIP D. HAMMOND
JUDSON A. WOOD
BY
AGENT

3,287,387
PROCESS FOR THE PRODUCTION OF AROMATIC ISOCYANATES
William I. Denton, Cheshire, and Philip D. Hammond and Judson A. Wood, North Haven, Conn., assignors to Olin Mathieson Chemical Corporation, a corporation of Virginia
Filed July 29, 1963, Ser. No. 298,314
19 Claims. (Cl. 260—453)

This invention relates to an improved process for the preparation of organic isocyanates and more particularly to a process for the manufacture of organic isocyanates by the reaction of phosgene with organic primary amines.

Many methods for the formation of organic isocyanates by reaction of phosgene with amine have been reported in the art. In one process described in the art phosgene is reacted with a corresponding primary amine in the presence of an inert organic solvent at a temperature of about −20° C. to about 60° C. to yield an intermediate reaction product which in turn is treated with an additional quantity of phosgene at a temperature of from about 80° C. to 320° C. to form the corresponding isocyanate. The crude product thus obtained is treated with an inert gas such as nitrogen, methane, etc. in order to remove unreacted phosgene and hydrogen chloride formed during the reaction following which the degassed product is distilled to separate the solvent from the isocyanate product.

In a modification of the above process, mono- and polyisocyanates have been prepared by forming the primary amine dihydrochloride salt, slurrying the salt in an inert organic solvent and then treating the slurry with phosgene to convert it into a crude solution of the corresponding isocyanate from which the isocyanate product can be recovered by conventional methods. In still another method it has been suggested to prepare aromatic isocyanates by reacting phosgene with an aromatic primary amine in the presence of an inert organic solvent and in the presence of a small amount of boron trifluoride or a boron trifluoride complex. The majority of the processes disclosed in the art for the preparation of aromatic isocyanates have been batch processes although a number of continuous processes have also been described. In one of these the reaction is carried out in an autoclave under autogenous pressure with subsequent venting of the gases at the conclusion of the reaction and distillation of the organic solvent solution of the isocyanate. In a more recent process the gases (excess phosgene and hydrogen chloride formed during the reaction) are vented as the reaction proceeds although a relatively high pressure is still maintained in the autoclave. In the process disclosed in U.S. Patent 2,875,226 isocyanates are produced by the reaction of phosgene and an amine while using as a solvent for the reaction the ethers of polyethers of polyhydric alcohols, for example, ethylene glycol diethyl ether, diethylene glycol diethyl ether, etc. and it is claimed that high yields of pure isocyanates are obtained in a relatively short time. Numerous other solvents useful in carrying out the reaction between amines and phosgene are enumerated in the art.

The disadvantages of the prior art processes are numerous. Where low temperatures are employed in conducting the initial phosgenation, the release of large amounts of phosgene during the elevation of the temperature to the final phosgenation temperature presents a difficult handling problem which is further magnified by the high toxicity of phosgene. Low temperature processes also suffer from another disadvantage in that the rate of reaction is relatively slow resulting in longer time cycles. In two-stage processes the product and the intermediate carbamyl chloride formed in the first stage may react with some of the starting amine to give substituted ureas and polyureas or other undesired products thus decreasing the yield of the isocyanate product. Although a number of the methods previously described have enjoyed considerable commercial success they are all subject to the disadvantage of producing excessive amounts of polymers and other undesirable by-products which materially reduce the yield of the isocyanate product.

It is the object of this invention to provide a continuous process for the manufacture of organic isocyanates in which the reaction is completed in a short time and which gives high yields of the isocyanate product of high purity. It has been discovered that organic isocyanates can be prepared by continuously introducing liquid phosgene and a solution of an organic primary amine into a reactor and continuously reacting with mixing under superatmospheric pressure the amine and the phosgene thus producing isocyanate. An inert organic solvent solution of the isocyanate product together with the excess phosgene and the hydrogen chloride formed during the reaction is continuously withdrawn from the reactor and the isocyanate recovered from the effluent stream.

In practicing the process of this invention a solution of the organic amine in an inert organic solvent at an elevated temperature is continuously introduced into a reactor which is maintained under superatmospheric pressure and which is equipped with an efficient agitator. Advantageously a portion of the solvent passed into the reactor can be recycle solvent, that is solvent recovered from the isocyanate-solvent stream which is continuously removed from the reactor. Since this recycle solvent always contains small amounts of the isocyanate and other materials which are known to react rapidly with the amine, the recycle solvent is preferably added to the amine stream, prepared by dissolving the amine in very pure inert organic solvent, just prior to the entrance of the amine stream into the reactor. Liquid phosgene heated to an elevated temperature is continuously introduced into the reactor through a sparger, the exit velocity of the phosgene from the sparger being selected for optimum mixing.

Temperature control of the reaction media is conveniently achieved in the process of this invention by controlling the inlet temperature of the phosgene and solvent-amine streams. It is particularly important that the phosgene stream temperature be such that no flashing or vaporization of the phosgene occurs before introduction into the intense mixing zone in the reactor. The reaction of the amine with phosgene is exothermic while the vaporization of the hydrogen chloride and phosgene are endothermic processes. Through regulation of the reactor pressure the degree of vaporization can be controlled so that it is not necessary to supply heat or to remove heat through the jacket of the reactor. Thus, with the novel process of this invention one is able to utilize the most efficient types of heat exchangers on the feed streams and the need for internal heat transfer coils in the reactor is avoided.

The agitated reactor employed in the process of this invention preferably is of the baffled type and is sized to provide a residence time of from about 2 to 20 minutes or more based on the flow of all liquid feed to the reactor. Preferably the reactor is operated as a completely liquid filled unit and operation in this manner has many advantages including: (1) the hydrogen chloride which is formed during the reaction is immediately removed from the reactor and it therefore has very little opportunity to react with the amine in the feed to form undesirable by-products, and (2) difficult control problems associated with the level control of a mixture of gases and liquids is eliminated. Agitation in the reactor is provided by means of a stirrer, impeller or any other suitable device.

It is necessary to maintain a high level of mixing in the reactor in order to achieve contact between the amine and phosgene as rapidly as possible and in order to minimize local excesses of the amine. The organic amine dissolved in the inert organic solvent preferably is introduced into the reactor at the point of highest shear so that intimate mixing is assured. Preferably the liquid phosgene is introduced through a sparger at a point so that it is swept immediately into the organic amine-solvent stream by the impeller or stirring device. The reaction which takes place in the vicinity of the impeller is substantially instantaneous.

From the reactor there is continuously withdrawn an effluent stream containing an inert solvent-isocyanate solution together with the excess phosgene and the hydrogen chloride formed in the reaction. From the effluent stream the isocyanate product can be conveniently recovered. For example, the reactor effluent under pressure can be exhausted into a zone of lower pressure where the hydrogen chloride formed in the reaction and the excess phosgene are removed as gases after which the isocyanate can be isolated from the organic solvent by distillation. Alternatively the reactor effluent can be sent to a reaction phase separator operating at the same temperature and pressure as the reactor from which the hydrogen chloride and major portion of the excess phosgene can be removed overhead and from the liquid stream leaving the separator the isocyanate product can be recovered by distillation.

Although one of the problems associated with the manufacture of isocyanates from organic amines and phosgene has been the formation of ureas, polymers and tars all of which reduce the yield, it has been found that with the process of this invention high yields of high quality product can be consistently achieved. With the novel process herein described substantially no reaction of the amine with the isocyanate produced is encountered and the amine and the phosgene react preferentially to form the corresponding isocyanate.

Among the important advantages of this novel, continuous process are that liquid phosgene without dilution by any solvent is utilized thus assuring that a high rate of reaction will result and, at the same time, it has been found that under these conditions the formation of undesirable by-products is avoided. Another advantage of this process is that the isocyanate-solvent solution formed when removed from the reactor yields on further processing by methods well known in the art a high purity isocyanate product. With regard to the use of liquid phosgene, another important advantage is that less solvent needs to be circulated through the process and recovered from the reactor effluent. In using liquid phosgene, rather than phosgene diluted with a solvent as feed to the reactor, the requirement for a separate phosgene-solvent feed preparation system is eliminated. Still another advantage of this process is that the isocyanate is formed in high yield in a one step reaction with a single reactor.

The temperature of the reaction can be varied widely. Generally it will range from about 110° C. to about 195° C. and preferably will be about 120° C. to 175° C. The temperature employed in the process of this invention is above the decomposition temperature of the intermediate carbamyl chloride formed by the reaction of phosgene with the amine. The pressure of the reactor can be varied from about 50 p.s.i.g. to about 300 p.s.i.g. or higher with the preferred pressure being between about 75 p.s.i.g and about 150 p.s.i.g.

It is essential in the operation of this process that a substantial stoichiometrical excess of phosgene be employed in order to obtain high yields of the isocyanate product. The molar ratio of the phosgene to the amine is such that there is at least a 75 percent stoichiometrical excess of the phosgene introduced into the reactor. In carrying out the process of this invention from 1.75 to about 10 moles of phosgene per $NH_2$ group of the primary organic amine will be employed with the preferred stoichiometrical excess of phosgene being from about 2.5 to about 4.0 moles of phosgene per $NH_2$ group. The concentration of the organic amine in the solvent is very important and should be selected to be between about 5 percent to about 25 percent by weight and preferably should be between about 5 percent to about 15 percent by weight.

A wide range of solvents may be employed in the process of this invention and, in fact, any inert organic solvent in which the phosgene and the amine are relatively soluble under the pressures used can be employed. Useful solvents include monochlorobenzene, o-dichlorobenzene, p-dichlorobenzene, tetrahydronaphthalene, benzene, toluene, xylene, chlorotoluenes, the trichlorobenzenes, cyclohexane, kerosene, carbon tetrachloride, trichloroethylene, diphenyl etc.

Any of the isocyanates commonly prepared by the reaction of amines with phosgene can be conveniently prepared by the novel process of this invention. Aliphatic, cycloaliphatic, alkaryl, aralkyl, aryl mono-, di- and polyisocyanates, etc. are readily prepared by this process which is especially applicable to the manufacture of aromatic isocyanates.

Suitable amines for use in the process of this invention include aniline, 2,4-tolylene diamine, 2,6-tolylene diamine, 2,4,6-tolylene triamine, toluidine, benzidine, naphthylamines, hexylamine, octylamine, dodecylamine, octadecylamine, tetramethylenediamine, octamethylenediamine, cyclohexylamine, phenylethylamine, phenylhexylamine, naphthyldodecylamine, methylene bis(4-phenylamine), 1,5-naphthylene diamine, chloroaniline, chlorohexylamine, etc. Mixtures of amines can also be utilized, for example, a mixture of 2,4-tolylene diamine and 2,6-tolylene diamine.

EXAMPLE I

Tolylene diamine (a mixture containing about 75 percent by weight of 2,4-tolylene diamine, about 19 percent by weight of 2,6-tolylene diamine and with about 3 percent other diamine isomers and 3 percent tolylene diamine residues) at a temperature of 100° C. was dissolved in monochlorobenzene containing 20 p.p.m. moisture to form a solution containing 20 percent by weight and then passed through a heat exchanger held at 140° C. The tolylene diamine solution thus prepared was diluted to a concentration of 9.07 percent by weight of tolylene diamine by line mixing with recycle monochlorobenzene and the resulting diamine solution (temperature 96° C.) was continuously pumped at the rate of 0.477 pound per minute for 4.0 hours into a closed reactor through a feed line which discharged at the tip of a six-bladed turbine impeller operating at a speed of 1400 r.p.m. Liquid phosgene at a rate of 0.345 pound per hour was pumped through a heat exchanger held at 65° C. where the phosgene was heated to 36° C. and then passed continuously into the reactor through a feed tube which terminated immediately below the center of the six-bladed impeller. The reactor was operated continuously as a completely filled unit at a temperature of 141° C. and a pressure of 76 p.s.i.g. for a period of 4.0 hours. A reaction stream containing liquid and gaseous materials including the tolylene diisocyanate product was continuously withdrawn from the reactor and sent to a separator which was operated at the same pressure as the reactor and at a temperature of 139° C. The gas phase from the separator was removed overhead while the liquid phase leaving the first separator was sent to second separator which was maintained at a temperature of 138° C. and at a pressure of 10 p.s.i.g. From the second separator there was separated overhead the phosgene and hydrogen chloride while the liquid phase containing the tolylene diisocyanate, monochlorobenzene and small amounts of phosgene and hydrogen chloride was sent to a separate purge column. The remaining phosgene and hydrogen chloride were removed as the overhead product from the purge column which was operated at atmospheric pressure and the isocyanate product and monochlorobenzene were removed as the liquid bottoms stream. The yield of tolylene diisocyanate as determined by analysis of the bottoms stream was 95.8 percent of theory based on the quantity of 2,4- and 2,6-tolylene diamine introduced into the reactor. The tolylene diisocyanate in the liquid bottoms stream removed from the purge column can be recovered in any suitable manner, such as by distillation.

EXAMPLES II–XII

A number of additional experiments were performed in the same manner and with the same apparatus employed in Example I. Experimental details relating to these examples is set forth in Table 1 which follows:

ing at the following rates in pounds per hour: phosgene, 10,078; monochlorobenzene, 18,757; tolylene diisocyanate, 2702; hydrogen chloride, 2529; tolylene diisocyanate residue, 349; tolylene diamine residue, 66; phosgene residue, 28. Withdrawn overhead from the reaction phase separator 22 by way of overhead line 23 are the following materials flowing at the following rates in pounds per hour: phosgene, 6926; monochlorobenzene, 1935; tolylene diisocyanate, 5; hydrogen chloride 2353. Through line 24 there is withdrawn from reaction phase separator 22 the following materials flowing at the following rates in pounds per hour: phosgene, 3152; monochlorobenzene, 16,822; tolylene diisocyanate, 2697; hydrogen chloride, 176; tolylene diisocyanate residue, 349; tolylene diamine Table 1

| Example | II | III | IV | V | VI | VII | VIII | IX | X | XI | XII |
|---|---|---|---|---|---|---|---|---|---|---|---|
| Run time, hr | 2.0 | 2.0 | 1.8 | 2.0 | 2.0 | 2.0 | 7.5 | 6.3 | 7.3 | 13.8 | 2.0 |
| Feed rate, lb./min. of liquid phosgene ($COCl_2$) | .558 | .441 | .421 | .412 | .714 | .668 | .524 | .521 | .406 | .349 | .391 |
| Feed rate, lb./min. of tolylene diamine (TDA) | .082 | .092 | .081 | .073 | .166 | .213 | .101 | .104 | .105 | .046 | .052 |
| Feed rate, lb./min. of monochlorobenzene (MCB) (introduced with TDA) | .889 | 1.028 | .917 | .930 | 1.740 | 1.814 | .940 | .961 | 1.019 | .463 | .487 |
| Avg. residence time, min | 5.2 | 5.1 | 5.6 | 5.6 | 3.1 | 3.0 | 5.1 | 5.1 | 5.2 | 9.3 | 8.6 |
| Agitator speed, r.p.m | 1,440 | 1,470 | 1,550 | 1,470 | 1,500 | 1,420 | 1,200 | 1,300 | 1,380 | 1,120 | 1,080 |
| TDA concentration in reactor feed, wt. percent | 5.4 | 5.9 | 5.7 | 5.1 | 6.3 | 7.9 | 6.4 | 6.6 | 7.1 | 5.4 | 5.6 |
| TDA feed stream concentration, wt. percent | 8.44 | 8.21 | 8.07 | 7.13 | 8.70 | 10.5 | 9.67 | 9.78 | 9.62 | 9.1 | 9.6 |
| $COCl_2$/TDA molar ratio | 8.4 | 5.9 | 6.5 | 7.2 | 5.3 | 3.9 | 6.4 | 6.2 | 4.8 | 9.4 | 9.3 |
| Pressure, p.s.i.g.: | | | | | | | | | | | |
| Reactor, No. 1 separator | 75 | 75 | 75 | 75 | 77 | 75 | 75 | 75 | 75 | 125 | 125 |
| No. 2 separator | 12 | 12 | 16 | 14 | 15 | 14 | 15 | 10 | 9 | 20 | 17 |
| Temperature, °C.: | | | | | | | | | | | |
| TDA feed | 80 | 78 | 98 | 81 | 71 | 77 | 102 | 99 | 115 | 110 | 136 |
| $COCl_2$ feed | 44 | 47 | 34 | 47 | 41 | 43 | 37 | 38 | 37 | 80 | 60 |
| Reactor | 140 | 142 | 141 | 144 | 138 | 139 | 140 | 140 | 140 | 148 | 138 |
| No. 1 separator | 140 | 142 | 130 | 142 | 140 | 140 | 140 | 126 | 136 | 130 | 133 |
| No. 2 separator | 136 | 145 | 126 | 144 | 136 | 138 | 140 | 123 | 138 | 120 | 128 |
| Tolylene diisocyanate yield (based on total amount of 2,4- and 2,6-TDA fed to reactor) | 94.8 | 96.7 | 91.9 | 91.0 | 100.4 | 90.0 | 92.0 | 91.0 | 92.0 | 90.7 | 93.5 |

EXAMPLE XIII

In FIGURE 1 the arrangement of the equipment utilized is shown. The numeral 1 in FIGURE 1 designates a monochlorobenzene solvent storage tank maintained at a temperature of 105° C. from which is withdrawn 8336 lbs. per hour of monochlorobenzene containing a trace of water by means of line 2. To the monochlorobenzene withdrawn from tank 1 by means of line 2 there is added by means of line 4 the following materials flowing at the following rates in pounds per hour from tolylene diamine storage tank 3: tolylene diamine (a mixture containing about 77.5 percent by weight of 2,4-tolylene diamine, about 19.5 percent by weight of 2,6-tolylene diamine and about 3 percent by weight of other diamine isomers), 2084; water, 7; other tolylene diamine isomers, 60; tolylene diamine residue, 66. Thus flowing through line 5 is a reactant stream containing the following materials flowing at the following rates in pounds per hour: tolylene diamine, 2144, water, 7; tolylene diamine residue, 66 and monochlorobenzene, 8336. The reactant stream flowing in line 5 (temperature 105° C.) is passed through solvent heater 6 where it is heated to a temperature of 145° C. and then passed by way of line 7 into mixing nozzle 8. From impure solvent storage tank 9 there is withdrawn through line 10 the amount of 10,319 lbs. per hour monochlorobenzene (temperature 167° F.) which is passed through solvent heater 11, line 12, and into mixing nozzle 8. The temperature of the stream flowing in line 12 is 190° C. From mixing nozzle 8 to the combined streams entering the said nozzle through lines 12 and 7 are passed into the reactor 13 which is maintained at a temperature 135° C. and at a pressure of 125 p.s.i.g. There is withdrawn from phosgene storage tank 14 and passed by way of line 15, filter 16, line 17, heater 18, and line 19 into reactor 13 the following mixture flowing at the following rates in pounds per hours: phosgene, 13,501; monochlorobenzene, 102; chlorine, 3; hydrogen chloride, 3; phosgene residue, 28. The temperature of the liquid phosgene stream flowing through line 19 into reactor 13 is 80° C. From reactor 13 there is withdrawn and passed by way of line 21 into reaction phase separator 22 the following materials flowing at the following rates in pounds per hour: phosgene, residue, 66; phosgene residue, 28. The tolylene diisocyanate product, representing a yield of 90.7 percent based on total amount of 2,4- and 2,6-tolylene diamine fed to the reactor, contained in the stream 24 flowing from separator 22 can be recovered in any suitable manner, such as by distillation.

EXAMPLE XIV

Methylene bis(4-phenylamine) at a temperature of 110° C. is dissolved in monochlorobenzene containing 20 p.p.m. moisture to form a solution containing 12.9 percent by weight of methylene bis(4-phenylamine) and the thus-formed solution is then passed thru a heat exchanger held at 140° C. The heated amine solution is continuously pumped at the rate of 1.021 pounds per minue for 3 hours into a closed reactor thru a feed line which discharged at the tip of a six-bladed turbine impeller operating at a speed of 1400 r.p.m. (tip speed was 900 feet per minute). Liquid phosgene at a rate of 0.558 pound per minute is pumped thru a heat exchanger held at 65° C. where the phosgene is heated to 44° C. and then passed continuously into the reactor through a feed tube which terminates immediately below the center of the six-bladed impeller. The reactor is operated as a completely filled unit at a temperature of 140° C. and a pressure of 75 p.s.i.g. for a period of 3.0 hours. A reaction stream containing liquid and gaseous materials including the methylene bis (4-phenyl isocyanate) product is continuously withdrawn from the reactor and sent to a separator which is operated at the same pressure as the reactor and at a temperature of 140° C The gas phase from the separator is removed overhead. The liquid phase leaving the first separator is sent to a second separator which is maintained at a temperature of 136° C. and a pressure of 12 p.s.i.g. from which there is separated overhead the phosgene and hydrogen chloride while the liquid phase containing the methylene bis(4-phenyl isocyanate), monochlorobenzene and small amounts of phosgene and hydrogen chloride is sent to a separate purge column. From the purge column which is operated at atmospheric pressure the remaining phosgene and hydrogen chloride are removed as the overhead product while isocyanate product and monochlorobenzene are removed as the liquid bottoms stream. The yield of methylene bis(4-phenyl isocyanate) as determined by analysis of the bottoms stream is about 91.0 percent based on the theoretical quantity. The methylene bis(4-phenyl isocyanate) in the liquid bottoms stream removed from the purge column can be recovered by distillation under reduced pressure.

Figure 2:
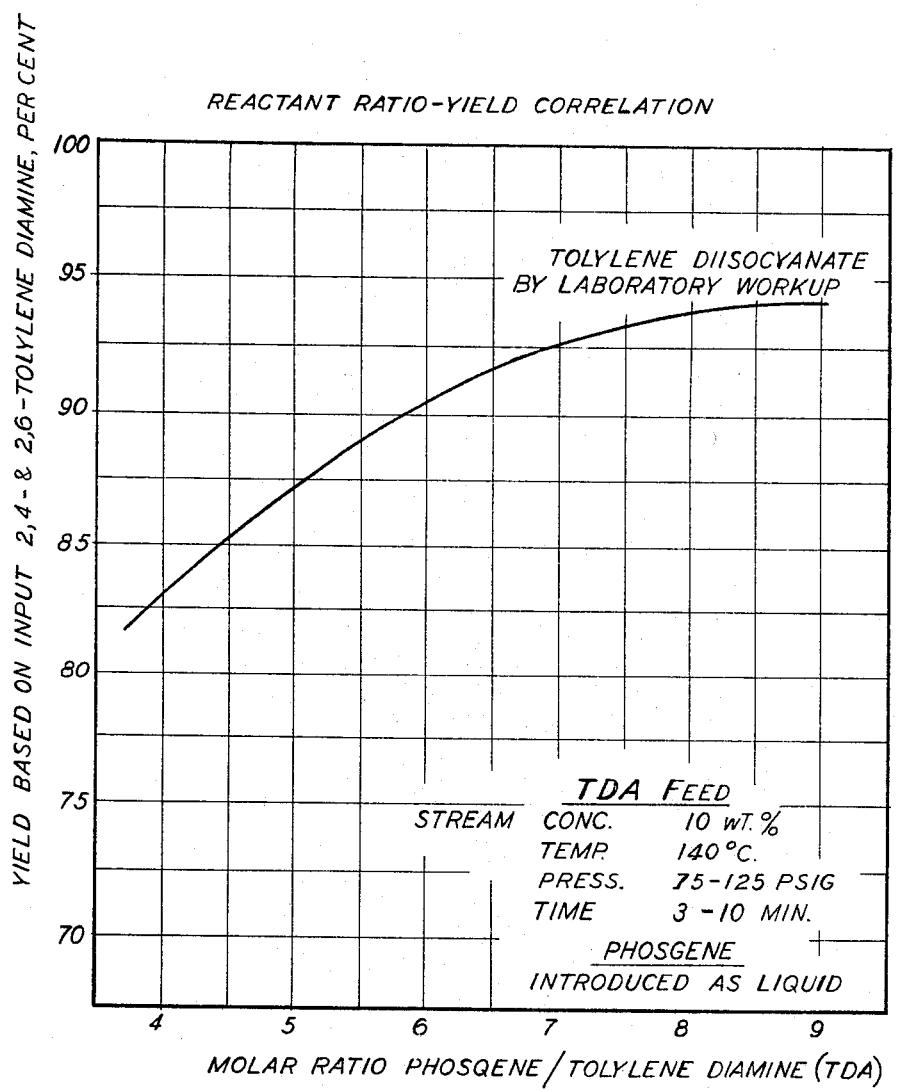

As previously pointed out, in the process of this invention it is essential that a substantial stoichiometrical excess of phosgene be employed in order to obtain high yields of the isocyanate product. The effect on the yield resulting when the molar ratio of phosgene/tolylene diamine is varied from 3.9 to 9.2 is shown in FIGURE 2. The data set forth was obtained from experiments carried out in the same manner as those of Examples II–XII. In FIGURE 2 the advantage of operating at phosgene/tolylene diamine ratios of 5 or higher is clearly shown.

The effect of the concentration of the amine in the feed stream on the yield of isocyanate product is shown in two series of experiments carried out in the same manner as Examples II–XII previously described. In all experiments the weight ratio of amine to monochlorobenzene solvent was maintained at 1 to 9, the variance in the experiments being the method of introducing the solvent into the reactor. In these experiments the phosgene to tolylene diamine molar feed ratio was approximately 8:1.

In the first series of experiments, under the base condition (Example A) where all of the monochlorobenzene was introduced with the tolylene diamine (to give a 10 percent by weight tolylene diamine solution) the mean tolylene diisocyanate yield from two experiments was 94.9 percent of theory, based on the 2,4- and 2,6-tolylene diamine isomers fed. When only one-half of the monochlorobenzene was introduced with the tolylene diamine stream (to give a 20 percent by weight tolylene diamine solution) and the remainder of the monochlorobenzene was introduced with the liquid phosgene (Example B) the mean yield of tolylene diisocyanate from four experiments was 89.2 percent, same basis.

In the first experiment of the second series (Example C) the yield of tolylene diisocyanate was 89.8 percent, same basis, when all of the monochlorobenzene was introduced with the tolylene diamine feed (to give a 10 percent by weight solution of tolylene diamine). When one-half of the monochlorobenzene was introduced with the tolylene diamine (to give a 20 percent by weight solution of tolylene diamine) and one-half was introduced in a separate stream as pure solvent (Example D) the yield of tolylene diisocyanate was 87.2 percent, same basis.

The results obtained in these experiments indicate that in the process of this invention higher yields are obtained when the tolylene diamine is diluted with at least 8–9 parts of monochlorobenzene before injection into the reactor.

What is claimed is:

1. In a process for continuously producing aromatic isocyanates by reaction of phosgene and an aromatic primary amine, the improvement which comprises continuously introducing liquid phosgene into a reactor and continuously introducing a solution of an aromatic primary amine in an inert organic solvent in a separate stream into the same said reactor and therein continuously reacting with mixing under superatmospheric pressure and at a temperature between about 110° C. and about 195° C. the said phosgene and the said amine thereby forming the corresponding isocyanate, continuously withdrawing from the reactor an inert organic solvent solution of the said isocyanate together with the excess phosgene and the hydrogen chloride formed during the reaction, and thereafter continuously recovering the said isocyanate, the amount of phosgene employed being at least 1.75 moles per $NH_2$ group on the amine.

2. The process of claim 1 wherein the reactor is maintained at a pressure of from about 50 p.s.i.g. to about 300 p.s.i.g.

3. The process of claim 1 wherein the solution of the aromatic primary amine in an inert organic solvent being introduced into the reactor contains from about 5 to about 25 percent by weight of the aromatic primary amine 4. The process of claim 1 wherein the aromatic primary amine is an aromatic diamine.

5. The process of claim 1 wherein the aromatic primary amine is 2,4-tolylene diamine.

6. The process of claim 1 wherein the aromatic primary amine is a mixture of 2,4-tolylene diamine and 2,6-tolylene diamine.

7. The process of claim 1 wherein the aromatic primary amine is methylene bis(4-phenylamine).

8. The process of claim 1 wherein the inert organic solvent is monochlorobenzene.

9. The process of claim 1 wherein the reactor is operated as a liquid filled unit, the said liquid being the reaction mixture resulting from the reaction of the phosgene and the aromatic primary amine in the said inert organic solvent.

10. The process of claim 1 wherein the aromatic primary amine is 2,4-tolylene diamine and the inert organic solvent is monochlorobenzene.

11. The process of claim 1 wherein the aromatic primary amine is a mixture of 2,4-tolylene diamine and 2,6-tolylene diamine and the inert organic solvent is monochlorobenzene.

12. The process of continuously producing 2,4-tolylene diisocyanate which comprises continuously introducing liquid phosgene into a reactor and continuously introducing a solution of 2,4-tolylene diamine in an inert organic solvent in a separate stream into the same said reactor and therein continuously reacting with mixing at a pressure of from about 50 p.s.i.g. to about 300 p.s.i.g. and at a temperature between about 110° C. and 195° C. the said phosgene and the said amine thereby forming 2,4-tolylene diisocyanate, continuously withdrawing from the reactor an inert organic solvent solution of the 2,4-tolylene diisocyanate together with the excess phosgene and the hydrogen chloride formed in the reaction and thereafter continuously recovering the said isocyanate, the amount of phosgene employed being at least 1.75 moles per $NH_2$ group of the diamine.

13. The process of claim 12 wherein the inert organic solvent is monochlorobenzene.

14. The process of claim 12 wherein the solution of the 2,4-tolylene diamine in an inert organic solvent being introduced into the reactor contains from about 5 to about 25 percent by weight of the 2,4-tolylene diamine.

15. The process of claim 12 wherein the reactor is operated as a liquid filled unit, the said liquid being the reaction mixture resulting from the reaction of the phosgene and the 2,4-tolylene diamine in the said inert organic solvent.

16. The process of continuously producing 2,4-tolylene diisocyanate which comprises continuously introducing liquid phosgene into a liquid filled reactor and continuously introducing a solution of from about 5 to about 25 percent by weight of 2,4-tolylene diamine in monochlorobenzene in a separate stream into the same said liquid filled reactor and therein continuously reacting with mixing at a pressure of from about 50 p.s.i.g. to about 300 p.s.i.g. and at a temperature between about 110° C. and 195° C. the said phosgene and the said 2,4-tolylene diamine thereby forming 2,4-tolylene diisocyanate, continuously withdrawing from the reactor a monochlorobenzene solution of the 2,4-tolylene diisocyanate together with the excess phosgene and the hydrogen chloride formed in the reaction and thereafter continuously recovering the said diisocyanate, the amount of phosgene employed being at least 1.75 moles per $NH_2$ group of the diamine, the liquid in the said liquid filled reactor being the reaction mixture resulting from the reaction of the phosgene and the 2,4-tolylene diamine in monochlorobenzene.

17. The process of continuously producing a mixture of 2,4-tolylene diisocyanate and 2,6-tolylene diisocyanate which comprises continuously introducing liquid phosgene into a liquid filled reactor and continuously introducing a solution of from about 5 to about 25 percent by weight of a mixture of 2,4-tolylene diamine and 2,6-tolylene diamine in monochlorobenzene in a separate stream into the same said liquid filled reactor and therein continuously reacting with mixing at a pressure of from about 50 p.s.i.g. to about 300 p.s.i.g. and at a temperature between about 110° C. and 195° C. the said phosgene and the said mixture of 2,4-tolylene diamine and 2,6-tolylene diamine thereby forming a mixture of 2,4-tolylene diisocyanate and 2,6-tolylene diisocyanate, continuously withdrawing from the reactor a monochlorobenzene solution of the 2,4-tolylene diisocyanate and the 2,6-diisocyanate together with the excess phosgene and the hydrogen chloride formed in the reaction and thereafter continuously recovering the said diisocyanates, the amount of phosgene employed being at least 1.75 moles per $NH_2$ group of the diamines, the liquid in the said liquid filled reactor being the reaction mixture resulting from the reaction of the phosgene and the mixture of 2,4-tolylene diamine and 2,6-tolylene diamine in monochlorobenzene.

18. The process of continuously producing methylene bis(4-phenyl isocyanate) which comprises continuously introducing liquid phosgene into a liquid filled reactor and continuously introducing a solution of from about 5 to about 25 percent by weight of methylene bis(4-phenylamine) in monochlorobenzene in a separate stream into the same said liquid filled reactor and therein continuously reacting with mixing at a pressure of from about 50 p.s.i.g. to about 300 p.s.i.g. and at a temperature between about 110° C. and 195° C. the said phosgene and the said methylene bis(4-phenylamine) thereby forming methylene bis(4-phenyl isocyanate), continuously withdrawing from the reactor a monochlorobenzene solution of the methylene bis(4-phenyl isocyanate) together with the excess phosgene and the hydrogen chloride formed in the reaction and thereafter continuously recovering the said isocyanate, the amount of phosgene employed being at least 1.75 moles per $NH_2$ group of the amine, the liquid in the said liquid filled reactor being the reaction mixture resulting from the reaction of the phosgene and the methylene bis(4-phenylamine) in monochlorobenzene.

19. The process of continuously producing 2,4-tolylene diisocyanate which comprises continuously introducing liquid phosgene into a liquid filled reactor and continuously introducing a solution of from about 5 to about 25 percent by weight of 2,4-tolylene diamine in monochlorobenzene in a separate stream into the same said liquid filled reactor and therein continuously reacting with mixing at a pressure of from about 50 p.s.i.g. to about 300 p.s.i.g. and at a temperature between about 110° C. and 195° C. the said phosgene and the said 2,4-tolylene diamine thereby forming 2,4-tolylene diisocyanate, continuously withdrawing from the reactor a monochlorobenzene solution of the 2,4-tolylene diisocyanate together with the excess phosgene and the hydrogen chloride formed in the reaction and thereafter continuously recovering the said diisocyanate, the amount of phosgene employed being from about 2.5 to about 4.0 moles per $NH_2$ group of the diamine, the said liquid in the liquid filled reactor being the reaction mixture resulting from the reaction of the phosgene and the 2,4-tolylene diamine in monochlorobenzene.

References Cited by the Examiner
UNITED STATES PATENTS

| | | | |
|---|---|---|---|
| 2,680,127 | 6/1954 | Slocombe et al. | 260—453 |
| 2,822,373 | 2/1958 | Beck | 260—453 |
| 2,847,440 | 8/1958 | Bloom et al. | 260—453 |

CHARLES B. PARKER, *Primary Examiner.*

DALE R. MAHANAND, *Assistant Examiner.*